Sept. 2, 1969 H. W. BROECKL ET AL 3,464,765

CARTRIDGE FOR STRIPLIKE RECORD CARRIER AND APPARATUS
FOR HANDLING STRIPLIKE RECORD CARRIER

Filed Aug. 2, 1966 6 Sheets-Sheet 1

Inventors:
Heinz Wilhelm Broeckl
Otto Freudenschuss
By Ernest G. Montague
attorney Inventors:
Heinz Wilhelm Broeckl
Otto Freudenschuss
By Ernest G. Montague
Attorney Inventors:
Heinz Wilhelm Broeckl
Otto Freudenschuss
By Ernest G. Montague
Attorney Sept. 2, 1969 H. W. BROECKL ET AL 3,464,765

CARTRIDGE FOR STRIPLIKE RECORD CARRIER AND APPARATUS FOR HANDLING STRIPLIKE RECORD CARRIER

Filed Aug. 2, 1966 6 Sheets-Sheet 4

Inventors:
Heinz Wilhelm Broeckl
Otto Freudenschuss
By Ernest G. Montague
Attorney Inventors:
Heinz Wilhelm Broeckl
Otto Freudenschuss
By Ernest G. Montague
Attorney Inventors:
Heinz Wilhelm Broeckl
Otto Freudenschuss
By Ernest G. Montague
Attorney United States Patent Office 3,464,765

Patented Sept. 2, 1969

3,464,765

CARTRIDGE FOR STRIPLIKE RECORD CARRIER AND APPARATUS FOR HANDLING STRIPLIKE RECORD CARRIER

Heinz Wilhelm Broeckl, Boblingen, Germany, and Otto Freudenschuss, Vienna, Austria, assignors to Karl Vockenhuber and Raimund Hauser, both of Vienna, Austria Filed Aug. 2, 1966, Ser. No. 569,629
Claims priority, application Austria, Aug. 3, 1965, A 7,184/65; Sept. 7, 1965, A 8,196/65
Int. Cl. G03b *23/02*
U.S. Cl. 352—72 23 Claims

ABSTRACT OF THE DISCLOSURE

A cartridge type motion picture projector has a cartridge holder which is pivotally attached to the projector housing. The cartridge for use in the projector has an arm which is pivotally attached to the cartridge at one end and carries film guide rollers at the opposite end. If the cartridge holder is pivoted away from the projector the cartridge can be placed in the holder. Then when the holder is pivoted to its closed position the guide arm on the cartridge is automatically pivoted away from the cartridge to form a guide path for the film.

The present invention relates to a cartridge for striplike record carriers, particularly for films, which cartridge has a spool space as well as guides, which guide the record carrier in the form of a U-shaped loop out of the spool space.

In a known cartridge of this kind, the U-shaped loop of the record carrier was generally an extension of the spool space. This arrangement was undesirable particularly in cartridges for films because the optical path of the illuminating system had to be deflected by a mirror as the space behind the film guide is not sufficient for accommodating a normal illuminating system.

The use of a mirror in the optical path of the illuminating system resulted in a considerable reduction of the aperture of this system so that projectors using such cartridges had only a small light output. To avoid this disadvantage, it has been suggested to arrange the guide for the record carrier, particularly for the film, in such a manner that the U-shaped loop included an acute angle with the spool space. It was suggested to provide said portion of the guide as an integrated component of the cartridge housing. This cartridge has the disadvantage that it is very thick and cannot be stacked.

It is an object of the present invention to provide a cartridge for a striplike record carrier and an apparatus for handling striplike record carriers in which these disadvantages are avoided.

It is another object of the present invention to provide a cartridge for a striplike record carrier and an apparatus for handling striplike record carriers in which the guide for the record carrier is provided on an arm, which is pivoted to the cartridge housing about an axis which is parallel to the web portion of the U-shaped loop of the film.

It is still another object of the present invention to provide a cartridge for a striplike record carrier and an apparatus for handling striplike record carriers in which preferably the above-mentioned guide is adapted to be swung into the cartridge housing so that the loop of the record carrier is protected when the arm is in its inoperative position. The new cartridge design enables the use of conventional illuminating systems of any desired, large aperture, and permits also of a convenient stacking of the cartridges. Another advantage is the fact that the cartridges are thin and that the film is protected when the cartridge is in storage.

It is yet another object of the present invention to provide a cartridge for a striplike record carrier and an apparatus for handling striplike record carriers in which devices are provided for unlocking the arm which carries the film guide and/or for pivotally moving the arm in an outward direction.

It is yet still another object of the present invention to provide a cartridge for a striplike record carrier and an apparatus for handling striplike record carriers in which preferably the projector has a cartridge carrier for receiving the film cartridge and this cartridge carrier is pivoted on an axis which is parallel to the axis of rotation of the film guide arm of the cartridge. An arm is provided which is pivoted on an axis that is parallel to the axis of the cartridge carrier and this arm has a free end which interengages with the film guide arm. The arm which is mounted on the projector is driven by the negative carrier by means of a gear train-linkage or the like and responds to a pivotal movement of the cartridge carrier to its operative position by effecting an outward pivotal movement of the film guide arm of the cartridge to its operative position.

With these and other objects in view, which will become apparent in the following detailed description, the present invention, which is shown by example only, will be clearly understood in connection with the accompanying drawings, in which.

Figure 2:
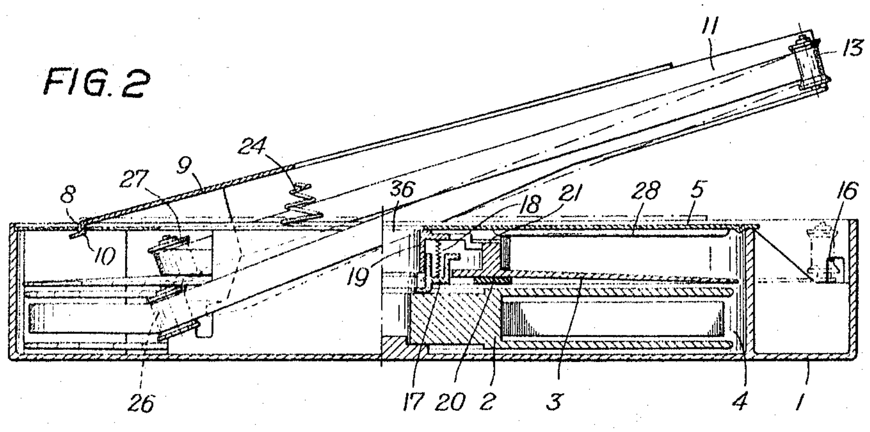
FIG. 2 is a sectional view taken on line II—II in FIG. 1.
Figure 4:
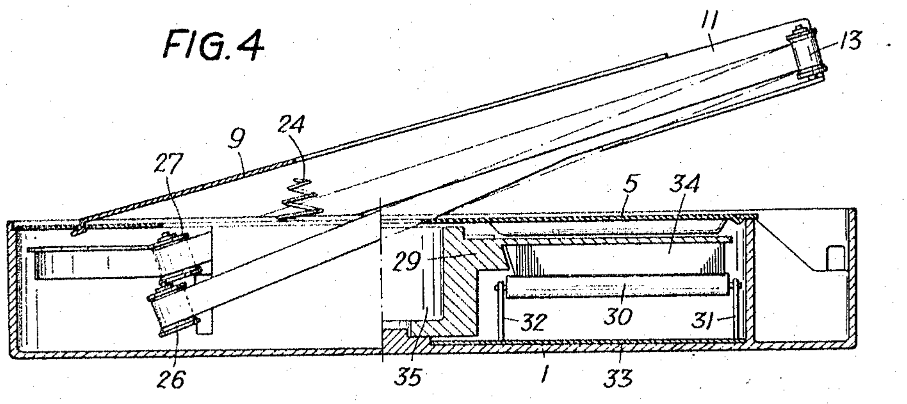
Figure 5:
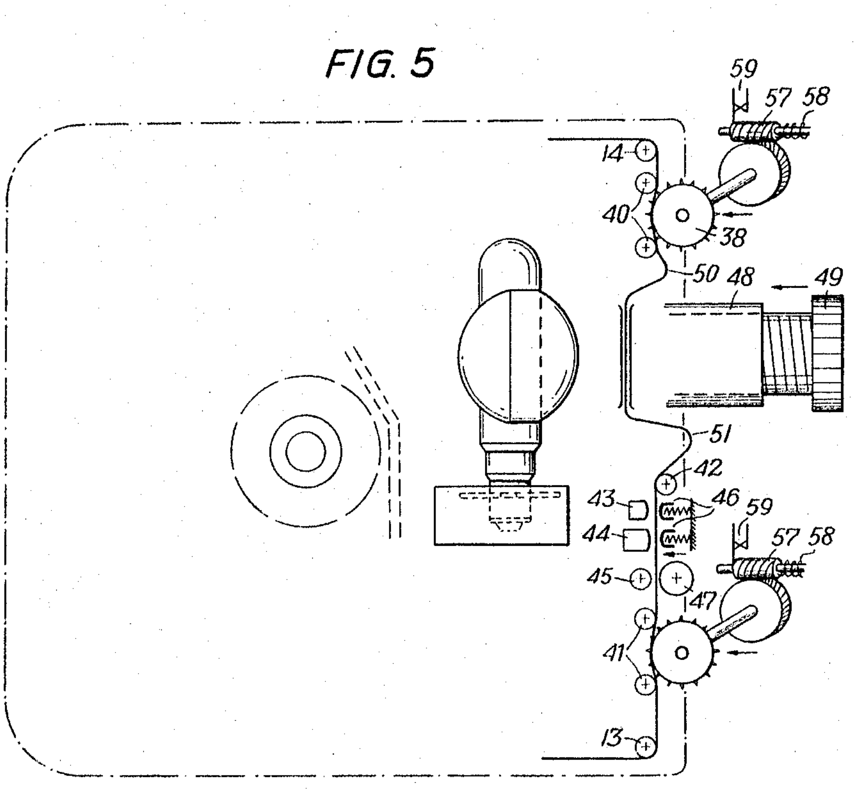
Figure 6:
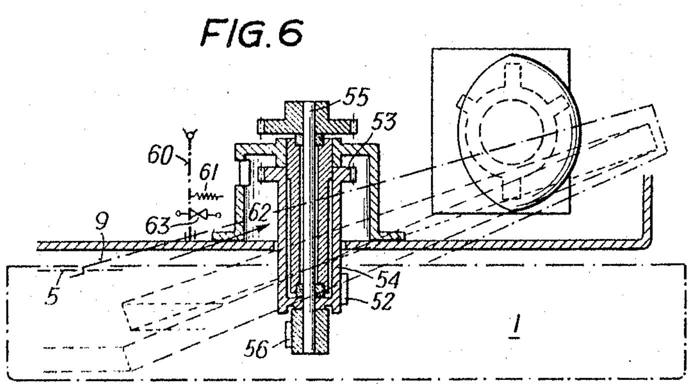
Figure 7:
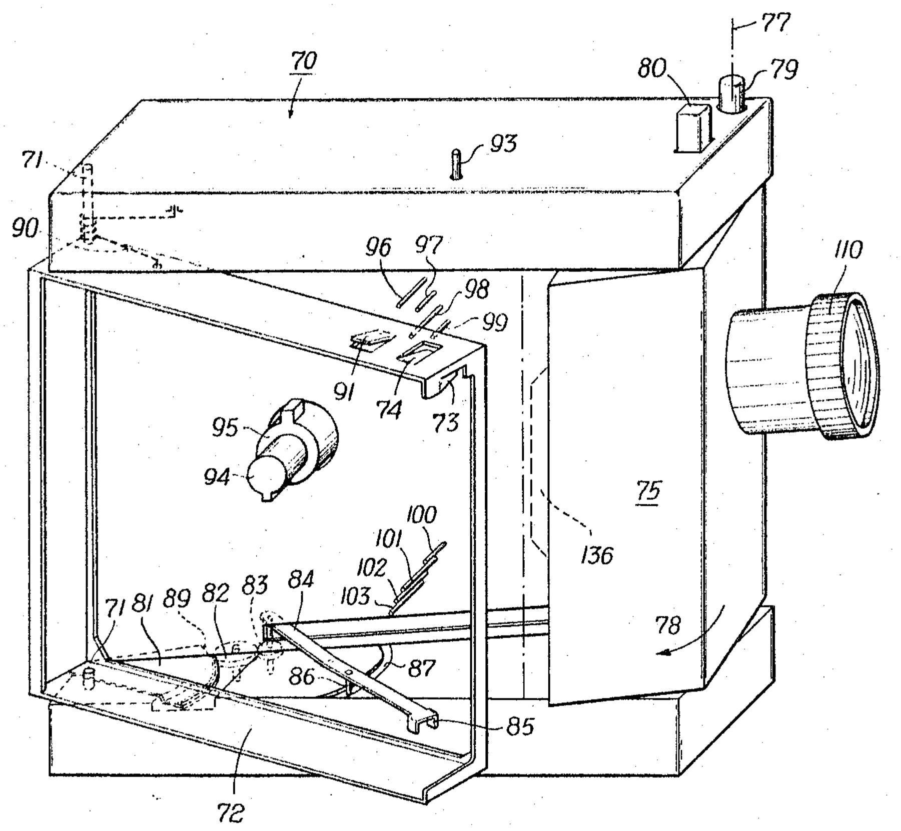
Figure 9:
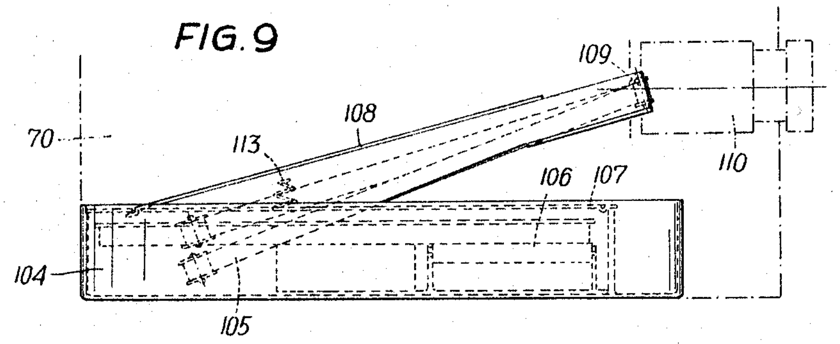
Figure 8:
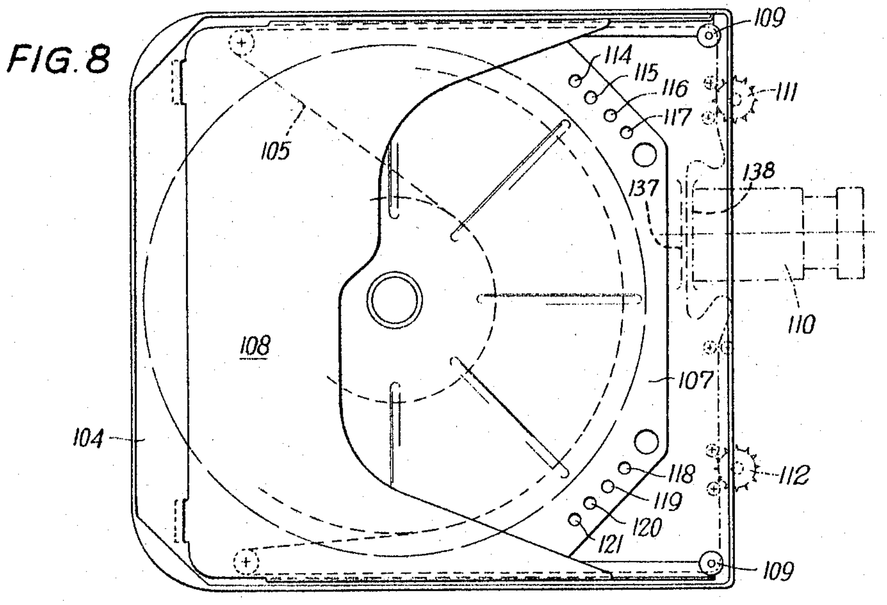
Figure 10:
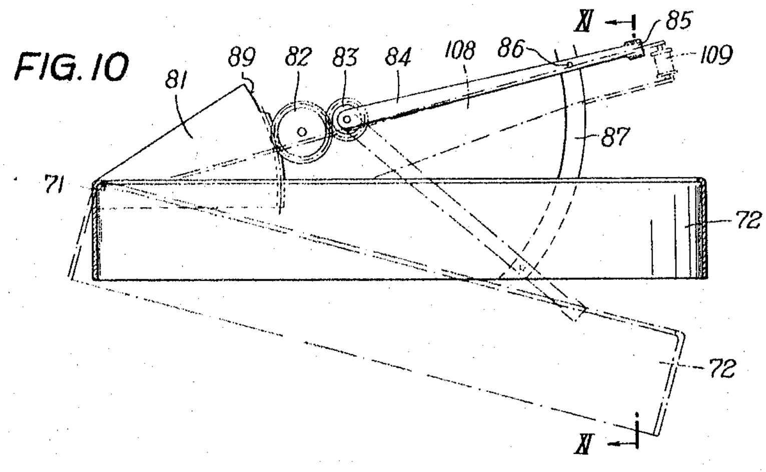
Figure 11:
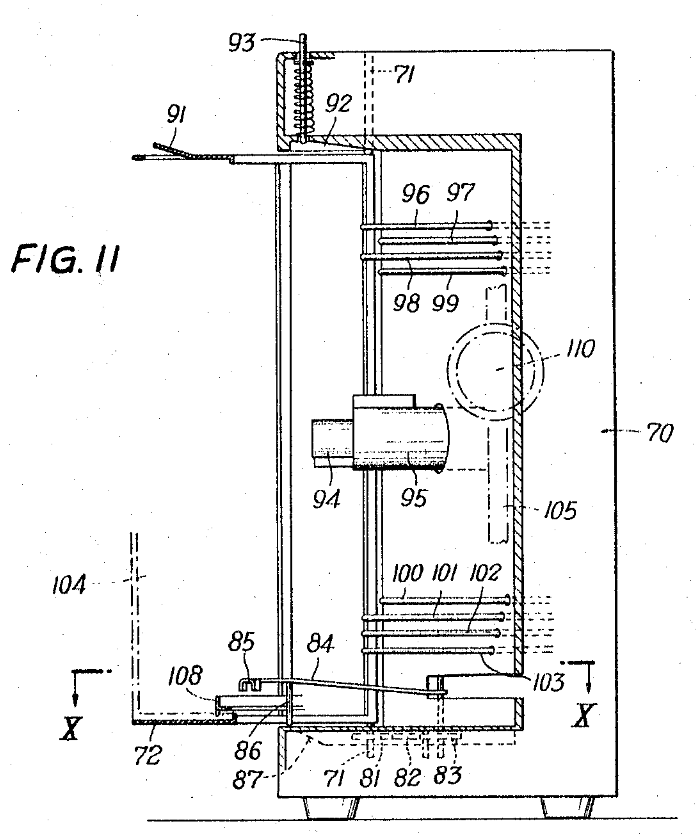
Figure 12:
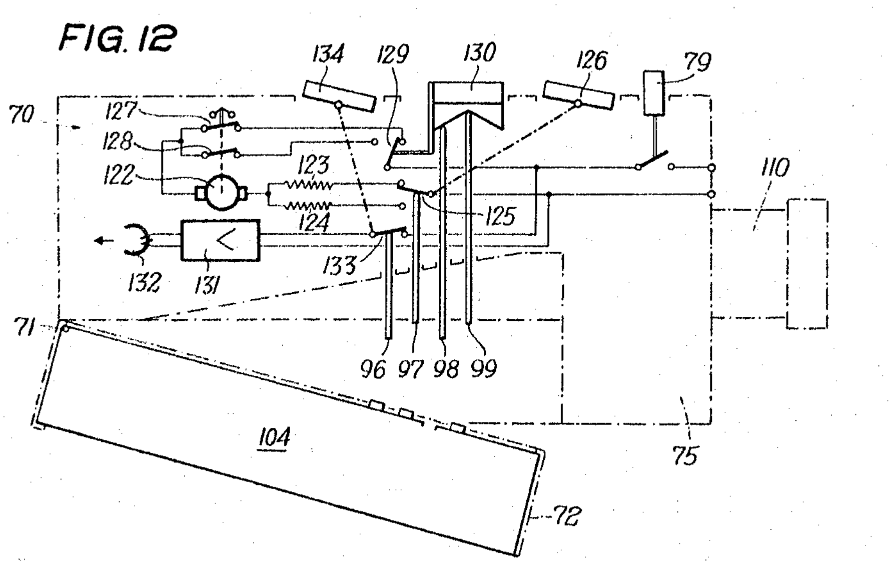

FIG. 4 is a sectional view similar to FIG. 2 and illustrates a modified embodiment, FIGS. 5 and 6 are two different views showing the novel cartridge in position on a motion picture projector, FIG. 7 is a perspective view showing a motion picture projector for film cartridges in its inoperative position, FIGS. 8 and 9 are coordinated views showing the novel cartridge and indicating in dotted lines various parts of the projector, FIG. 10 is a horizontal sectional view showing a part of the novel projector, FIG. 11 is a sectional view taken on line XI—XI in FIG. 10, and FIG. 12 is a diagrammatic view showing the switches which are operated by the cartridge and control the operation of the projector.

Figure 1:
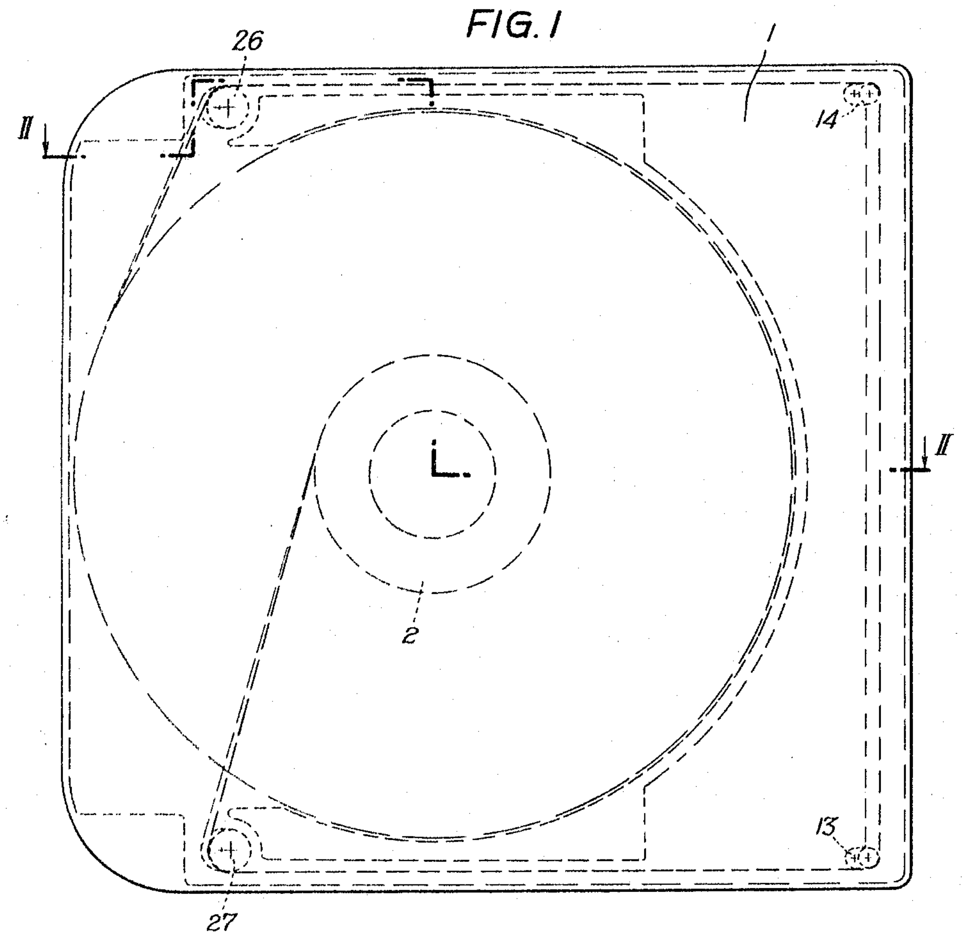
FIG. 1 is a front elevation showing the novel cartridge.
Figure 3:
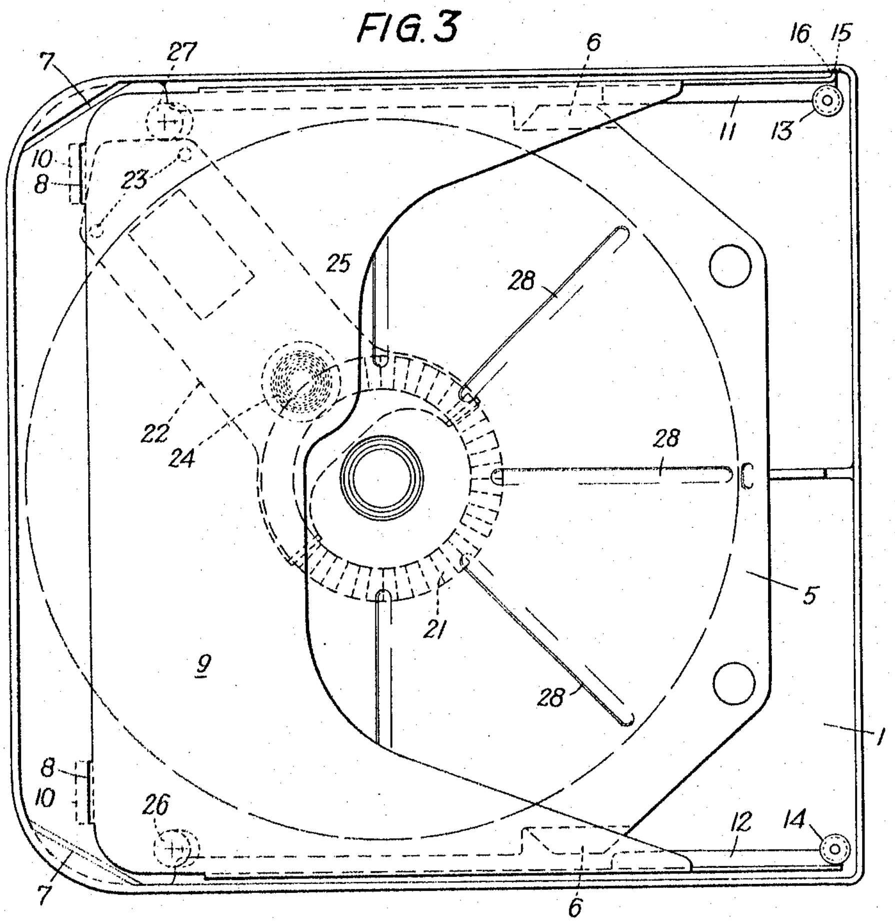
FIG. 3 is a rear view showing the cartridge of FIGS. 1 and 2.

In FIGS. 1 to 3, the cartridge comprises a tublike housing 1, which consists of plastics material and contains a commercially available film spool 2 and a single-flange spool 3, which is coaxial with the spool 2. The spool space 4 of the cartridge accommodates the two film spools and is closed by a substantially flat metal cover 5, which has lugs 6 and 7. These lugs enter registering openings of the cartridge housing to secure the cover 5 to the housing. The cover 5 has two apertures 8, which receive an offset portion 10 of a flap 9. The flap 9 has two arms 11, 12, which are provided at their free end with deflecting rollers 13, 14. The arm 11 carries at its free end an extension 15, which cooperates with an aperture 16 in the cartridge wall when the arms 11, 12 have been swung into the cartridge. The hub of the single-flange spool 3 contains a ring 17, which is supported by springs 18 on a wall of the hub 19 of the single-flange spool 3 and is urged by said springs against the spool 2. By this action the single-flange spool 3 is lifted from the spool 2 so that the brake lining 20 is ineffective. On the side remote from the spool 2, the hub 19 of the single-flange spool 3 has face teeth 21, which cooperate with a pivoted latch 22, which is held to the cover 5 by rivets 23 and engages said cover under initial stress. The latch 22 carries a conical spring 24, which extends through an aperture 25 in cover 5 and tends to urge the flap 9 away from the cartridge. When the arms 11 and 12 are in their inner position, the spring 24 tends to move the latch in the direction of the axis of the spring into engagement with the teeth 21 of the single-flange spool 3. This engagement prevents a rotation of the single-flange spool 3 and causes an axial displacement of the single-flange spool 3, whereby at least one brake lining 20 is urged against the spool 2, which is thus also held against rotation.

The film is withdrawn from the feed spool 2 and moves around a roller 26 mounted in the cartridge housing to the roller 14 carried by the film guide arm 11, further to the roller 13 and around the roller 27, which is mounted in the cartridge housing 1, to the single-flange spool 3. The axes of rollers 26 and 27 are so inclined to the axis of the spool that the film is turned into the proper plane when the film guide arms 11, 12 are in operative position (FIG. 2). To prevent a lateral displacement of the film which is coiled on the single-flange spool, the metal cover 5 is provided with radial beads 28.

When the cartridge is to be stored, the flap 9 and the two film guide arms 11 and 12 are swung into appropriate spaces in the cartridge housing so that the film is perfectly protected. In the inner position of the flap 9, a nose provided on the guide arm 11 snaps into an opening 16 formed in the cartridge housing (see FIG. 3) so that the film guide arms are locked in their inoperative position.

FIG. 4 is a view similar to FIG. 2 and shows a cartridge which is provided with a spool for a loop film rather than with feed and take-up spools. The spool has the form of a single-flange spool 29 provided with a tapered hub. A series of radially extending rollers 30 are disposed opposite to the flange of the single-flange spool. These rollers are mounted on lugs 31 and 32 of a plate 33, which is inserted in the spool space and serve for guiding the coiled film 34. The end of the film is withdrawn from the interior of the spool and moves around rollers 26, 14, 13 and 27 and back into the spool space, where it is wound up at the outside periphery of the coil 34. The bore 35 is much larger than the bores 36 and 37 of the spools 3 and 2 of the model which has been described hereinbefore so that there is no operative engagement with drivers provided on the projector. The only difference between the cartridge of FIG. 4 and that of FIGS. 1 and 3 resides in the means provided in the spool space. All other parts are in full agreement with those of the embodiment described hereinbefore and their description needs not be repeated.

FIGS. 5 and 6 are diagrammatic views showing the novel cartridge in position on a sound film projector. The film moves around the roller 14 into a substantially straight film guide of the projector. As is apparent from FIG. 6, the film is initially inclined with respect to the optical axis and is oriented at right angles to the optical axis when the cartridge carrier or the remaining parts of the feeding system are moved into the operative position. This deflection of the film into and out of the proper plane is effected in the short vertical film portions disposed between the roller 14 and the upper feed sprocket 38, on the one hand, and between the lower feed sprocket 39 and the roller 13, on the other hand. The guide pins 40 and 41, which are associated with the upper and lower feed sprockets, respectively, are disposed on the straight line which connects the rollers 14 and 13. A guide pin 42 between the cartridge carrier and the sound heads is also disposed on said straight line. The erasing head 43 and the recording and playback head 44 are set back from said straight line. The same applies to the driving capstan 45, which is connected to a flywheel, not shown. During a recording or reproduction of sound, the film is urged by the pressure shoes 46 and the pressure roller 47 against these parts.

The mode of operation of the novel apparatus is essentially as follows: The cartridge is applied to the projector, which is provided with means, not shown, for disengaging the detent means 15, 16 for the film guide arm 11 and for pivotally moving the film guide to its operative position. The film follows initially a straight course. The upper and lower feed sprockets are displaced to interengage with the film. At the same time, the lens carrier 48 with the projection lens 49 is also displaced in the direction of the arrow so that the cartridge carrier is closed. A slight rotation is imparted to the sprocket 38 in the counterclockwise sense and to the lower sprocket in the clockwise sense so that the loops 50 and 51 are formed. For a recording or playback of sound, the pressure members 46 and the pressure roller 47 are displaced in the direction of the arrow so that the film engages the sound heads as well as the driving capstan. During a normal projection, the single-flange spool 3 in the film cartridge is driven by a driver 52, which extends into the bore 36 and which is mounted on a rotatable sleeve 54, which is driven by the gear 53. A shaft 55 is coaxial with the sleeve 54 and provided with a driver 56 for driving the spool 3 during reverse projection or rewinding.

For a final stop of the projector when the film has been completely unwound, the upper and lower feed sprockets are provided with overload protectors. Both feed sprockets are driven by a worm gearing, which has a worm 57, which is axially displaceable against the action of a spring 58. As the film end is rigidly secured to the hub of the spool 3, there is a sudden rise of the load on the sprocket when the film has been unwound and this increased load results in an axial displacement of the worm 57. As a result of the axial displacement of the worm, a switch 59, which is arranged in the motor circuit, is opened to stop the projector. After a reverse projection or rewinding, the projector circuit is opened in a similar way by means of the lower feed sprocket.

In addition or as an alternative to this end stop device, another end stop device may be provided. This is shown in FIG. 6 and requires the use of a cartridge in which the flap 9 is pivoted to the metal cover 5 and longitudinally slidable relative thereto. This can easily be accomplished by the provision of larger apertures 8. A lever 60 is mounted to the projector and under the action of a spring 61 tending to move the flap 9 in the direction of the arrow 62. When the film has been unwound, the loop of film is tightened and applies a force in the direction opposite to the arrow 62 to the roller 14 or 13. This causes a movement of the lever 60 in the clockwise sense whereby the switch 63 of the projector motor is opened.

FIG. 7 shows a projector 70 for showing films held in the above-described cartridges. Elements which are not essential for the present invention, such as the illuminating system, are not shown. A cartridge carrier 72 is pivoted on a pivot 71 to the projector housing and comprises mainly an open-front frame, into which the film cartridge is slidably inserted. Cut-out resilient lugs 73 and 74 are struck out from the cartridge carrier and urge the cartridge against the left-hand inside surface and the lower inside surface of the cartridge carrier. A block 75 mounts the driving mechanism of the projector and the projection lens 110. The block 75 is pivoted to the projector on a pivot 77. The block is shown in its inoperative position. When it is desired to show a film, the block is pivotally moved in the direction of arrow 78 to its operative position. This movement as well as the looping of the film and the operation of the driving mechanism of the projector are initiated by the operation of the push button 79. The stop push button of the projector is indicated at 80.

FIG. 7 shows a toothed segment 81, which is coupled to the cartridge carrier and by means of an idler gear 82 drives a pinion 83. A shaft 84 is secured to the shaft of the pinion 83 and carriers a fork 85 at its free end. By means of a pin 86, the arm 84 bears resiliently on a cam 87, which is fixed in the projector. The toothed segment 81 has a recess 89, which registers with the idler gear 82 when the cartridge carrier is in the position shown. As a result, the idler gear 82 and the arm 84 are not driven during the first part of the inward pivotal movement of the cartridge carrier toward its operative position.

The cartridge carrier is held in its inoperative position by a spring 90 and is provided with a resilient lug 91, which snaps into a registering aperture 92 of the projector housing when the cartridge carrier is in its operative position so that the cartridge carrier is held in this position. A pin 93 can be depressed to release this detent, whereafter the cartridge carrier can be returned to its inoperative position (see also FIG. 11). FIG. 7 shows the coaxial drive shafts 94 and 95 for the feed and take-up spools of the cartridge. Control pins 96 to 103 cooperate with control switches for the projector and with coded cam means on the cartridge.

FIGS. 8 and 9 show a cartridge which comprises a housing 104 containing a loop film winder, which is known per se. In known manner, the film 105 is withdrawn at the core of the spool and is wound up at the outside periphery when the film has passed through the projector. The coiled film is laterally supported by radially extending rollers 106. The spool space of the cartridge is closed by a sheet metal cover 107, to which the film guide arm 108 is pivoted. This arm is shown in FIG. 9 in its operative position, in which it guides the film around rollers 109 to gate 137 carried by the housing against a film pressure member 138 carried by the housing at the projecting portion of the projector, which is provided with a lens 110. FIG. 8 shows in dotted lines sprockets 111 and 112 of the projector. The film guide arm 108 is held in its operative position by a conical spring 113 and is locked in its inoperative position by a detent device, which is provided in the cartridge housing and not shown in detail. The gate is adjacent the web portion when the guide arm 108 is in its operative position. The film pressure member 138 is movable relative to the gate between an inoperative position, in which it is spaced from the gate 137, and an operative position, in which it bears resiliently on the gate. The locking means prevents a movement of the cartridge carrier to and from its operative position when the film pressure member 138 is in its operative position, and permits movement of the cartridge carrier to and from its inoperative position when the film pressure member is in its inoperative position. Bores 114 to 121 are formed in the cover 107 of the cartridge and cooperate with control pins 96 to 103 for controlling certain functions of the projector.

FIG. 12 is a diagrammatic representation of the control means for the projector. This control means is responsive to the coded cam means on the cartridge. A motor 122 for driving the projector has two field windings 123 and 124, which act oppositely to each other. A change-over switch 125 is operable by a rocker 126 to energize the motor alternatively through the field winding 123 and the field winding 124. The projector runs in a forward sense in the first case and in reverse sense in the second case. The motor circuit includes two centrifugal switches 127 and 128, which are alternatively rendered operative by a change-over switch 129. The latter is operated by a slide member 130 and enables a setting of the projector for operation at two different rates (18 frames per second or 24 frames per second). The motor circuit comprises also a start switch, which is operable by the push button 79, as is diagrammatically indicated in FIG. 12. FIG. 12 shows a recording amplifier 131, which feeds a magnetic head 132 for erasing a magnetic edge track of the film and for recording sound on this track. The recording amplifier 131 is energized by a switch 133, which can be operated by a push button 134. Switches 133 and 125 are directly connected to the control pins 96 and 97. Pins 98 and 99 are moved by a cam face of the slide member 130.

The novel arrangement has the following mode of operation: When the projector is in the position shown in FIG. 7, the cartridge is initially inserted from the front into the cartridge carrier 72. The cartridge and the cartridge carrier are then swung into the free space provided for them in the projector, whereby the toothed segment 81 is rotated. As the idler gear 82 is in registry with the recess 89 in the toothed segment, the idler gear 82 cannot yet transmit the movement to the arm 84. This arm engages a wall of the cartridge and is moved in unison with the cartridge during the pivotal movement of the latter. During this movement, the pin 86 secured to the arm 84 rides over the inclined, flat cam face 87, so that the arm 84 moves downwardly owing to its own resiliency until the fork 85 embraces the film guide arm 108 of the cartridge. As the pivotal movement of the cartridge carrier 72 is continued, the teeth of the toothed segment 81 begin to mesh with the idler gear 82, so that the pinion 83 and the arm 84 are driven at a relatively high angular velocity. As a result, the force acting on the detent for locking the film guide arm in its inoperative position is overcome and the film guide arm 108 is pivotally moved to its operative position. The cartridge carrier is locked by the leaf spring 91, which is struck out of the frame of the carrier and snaps into an aperture 92 provided for this purpose in the projector housing. The resilient lugs 73 and 74 struck out from the frame of the cartridge carrier 72 act to align the cartridge and hold it in position in the cartridge carrier. The pin 93 can be depressed to move the leaf spring 91 into the plane of the frame of the cartridge carrier so that the detent is released and the cartridge case returns to its inoperative position under the spring 90. During this movement, the arm 84 swings the film guide arm 108 into the cartridge. During the final phase of the movement, the interlock between the fork 85 of the arm 84 and the film guide arm 108 is eliminated.

The coded cam bores 114 to 121 of the cartridge enable an initiation of predetermined operations of the projector. For instance, in the case of borrowed films it may be desirable to lock a sound recording apparatus of the projector, so that the original recording will not be erased. When loop films cartridges are employed, a reverse operation of the projector must be prevented because the film can be fed only in one direction in these cartridges. On the other hand, an operation in the forward and reverse direction must be enabled when cartridges are used, which comprise feed and take-up spools. It is also desirable to provide the cartridge with a code cam which indicates the number of frames per second of the film. FIG. 12 indicates control means for two functions of the projector. When the cartridge is pivotally moved inwardly, the switches 133 and 125 will be automatically operated when the corresponding bores 114 and 115 of the cartridge are closed by screws or by plugs of plastic material. In this case, a magnetic sound recording is prevented by the switch 133 and the projector is set for forward operation by the switch 125. Two bores 116, 117 are provided for controlling the number of frames per second. One of these two bores is closed at any time. If the position of the pins 98, 99 is not in agreement with the coding on the cartridge, the cartridge carrier cannot be completely swung into the projector and does not snap into the same. When the cartridge carrier is released, it will return to its inoperative position by the spring. The film rate switch 130 must be shifted until the cartridge can be introduced into the projector. The control pins and the coded cam means on the cartridge enable a control of any other functions of the projector, e.g. an automatic setting of the projector to the showing of silent film or sound film. The coded cam means of the cartridge can also be used to effect a change from magnetic sound playback to optical sound playback.

The invention is not restricted to the examples which are shown. Numerous modifications are possible within the scope of the invention. For instance, the gear drive 81–83 for the arm 84 may be replaced by a crank drive or a linkage. Alternatively, the arm 84 may be moved by a cam.

Similarly, the means for selecting the number of frames per second and for reversing the sense of rotation shown in FIG. 12 may be replaced by suitable speed-changing or reversing transmissions.

The pivoted block 75, which carries the projection lens 110, the film pressure plate, not shown, and the sprockets 111 and 112, may be provided with an extension 136, which is indicated in dash-and-dot lines in FIG. 7. This extension prevents an inward pivotal movement of the cartridge carrier 72 when the film channel is closed, and locks the cartridge case in its operative position as long as the film channel is closed. This arrangement prevents wrong operations of the projector to a large extent.

The cartridge is not restricted to the use with motion picture projectors but may be used to equal advantage in motion picture cameras and tape recordings and reproducing equipment.

What is claimed is:

1. A cartridge for a striplike record carrier, which comprises a cartridge housing defining a spool space, spool means rotatably mounted in said spool space and adapted to hold a striplike record carrier and operable to supply said record carrier out of said housing and to take up said record carrier back into said housing, strip guiding means defining a U-shaped path for said record carrier outside said housing, said path having two limb portions and a generally straight web portion connecting said limb portions, and a guide arm which carries said strip guiding means and which is pivoted to said housing on an axis which is parallel to said web portion.

2. A cartridge as set forth in claim 1, in which said spool means comprise a loop film winder.

3. A cartridge as set forth in claim 1, in which said spool means comprise coaxially arranged feed and take-up spools.

4. The cartridge, as set forth in claim 1, wherein said housing comprises a tublike body, said body being open on one side, a substantially flat cover closing said body on said open side, said cover having openings, said guide arm being pivotally movable relative to said housing between an operative position, in which said web portion is laterally spaced from said housing on said open side, and an inoperative position, in which said web portion is aligned with said housing, and said guide arm comprising offset portions which extend into said openings.

5. A cartridge as set forth in claim 1, in which said limbs are parallel and said guide arm is displaceable relative to said housing in a direction which is parallel to said limbs.

6. A cartridge as set forth in claim 1, in which said guide arm is pivotally movable relative to said housing between an operative position, in which said web portion is laterally spaced from said housing, and an inoperative position, and said housing defines a space which accommodates said guide arm in said inoperative position.

7. The cartridge, as set forth in claim 6, wherein in said inoperative position said web portion is aligned with said housing, and spring means are provided, which are arranged to urge said arm in the direction from said inoperative position to said operative position, whereby detent means are arranged to releasably hold said arm in said inoperative position.

8. A cartridge as set forth in claim 1, in which said guide arm is pivotally movable relative to said housing between an operative position, in which said web portion is laterally spaced from said housing, and an inoperative position, in which said web portion is aligned with said housing, and which comprises locking means controlled by said guide arm and arranged to hold said spool means against rotation when said guide arm is in said inoperative position and to release said spool means for rotation when said guide arm is in said operative position.

9. A cartridge as set forth in claim 8, in which said spool means comprise a spool flange formed with a series of teeth, and which comprises a latch, which is pivoted to said cartridge housing and faces said teeth and has an extension adapted to cooperate with said teeth, and spring means interposed between said guide arm and said latch and arranged to move said extension into engagement with said teeth in response to a movement of said guide arm from said operative position to said inoperative position.

10. A cartridge as set forth in claim 9, in which said spool means comprise coaxially arranged feed and take-up spools having adjacent flanges covered on their confronting faces with at least one friction lining and spring means are provided, which tend to keep said friction linings axially spaced and are yieldable to permit said friction linings to interengage when said arm is moved from said inoperative position to said operative position.

11. A motion picture projector which comprises a cartridge, said cartridge comprising a cartridge housing defining a spool space, spool means rotatably mounted in said spool space and adapted to hold a striplike record carrier and operable to supply said record carrier out of said housing and to take up said record carrier back into said housing, strip guiding means defining a U-shaped path for said record carrier outside said housing, said path having two limb portions and a generally straight web portion connecting said limb portions, and a guide arm which carries said strip guiding means and which is pivoted to said housing on an axis which is parallel to said web portion, said guide arm being pivotally movable between an operative position, in which said web portion is laterally spaced from said housing, and an inoperative position, in which said web portion is aligned with said housing, said projector further comprising a cartridge carrier supporting said cartridge, and arm actuating means operable to move said guide arm from said inoperative to said operative position.

12. A motion picture projector as set forth in claim 11, which comprises an electric circuit energizable to operate the projector, and a switch which is operable to close said circuit and initiate the operation of said arm actuating means.

13. A motion picture projector as set forth in claim 11, in which said limbs are parallel and said guide arm is displaceable relative to said housing in a direction which is parallel to said limbs, said projector comprising means urging said guide arm in said parallel direction to move said web portion away from the axis of said spool means, an electric circuit energizable to operate the projector, and a stop switch arranged to deenergize said circuit in response to a movement of said guide arm in said parallel direction whereby said web portion is moved closer to the axis of said spool means.

14. A motion picture projector as set forth in claim 11, in which said cartridge comprises detent means arranged to releasably hold said guide arm in said inoperative position and in which said arm actuating means are arranged to operate said detent means so as to release said guide arm prior to moving said guide arm from said inoperative position.

15. A motion picture projector as set forth in claim 11, which comprises a projector housing pivotally mounting said cartridge carrier for movement between operative and inoperative positions on an axis which is parallel to the axis of said guide arm, detent means arranged to releasably hold said cartridge carrier in its operative position, and spring means urging said cartridge carrier toward its inoperative position.

16. A motion picture projector as set forth in claim 11, which comprises a projector housing pivotally mounting said cartridge carrier for movement between operative and inoperative positions on an axis which is parallel to the axis of said guide arm, a gate carried by said housing and disposed adjacent to said web portion when said guide arm is in its operative position, a film pressure member carried by said housing and movable relative to said gate between an inoperative position, in which it is spaced from said gate, and an operative position, in which it bears resiliently on said gate, and locking means arranged to prevent a movement of said cartridge carrier to and from its operative position when said film pressure member is in its operative position, and to permit said movement of said cartridge carrier to and from its inoperative position when said film pressure member is in its inoperative position.

17. A motion picture projector as set forth in claim 11, which comprises a projector housing pivotally mounting said cartridge carrier for movement between operative and inoperative positions on an axis which is parallel to the axis of said guide arm and in which said cartridge housing is provided with recessed cam means and which comprises electric switch means for controlling at least one predetermined function of said projector, and pin means carried by said projector housing and arranged to move from an inoperative position to an operative position in response to a predetermined actuation of said switch means, said pin means being arranged to prevent a movement of said cartridge carrier to its operative position unless said pin means are in registry with and received by said recessed cam means.

18. A motion picture projector as set forth in claim 11, which comprises a projector housing pivotally mounting said cartridge carrier for movement between operative and inoperative positions on an axis which is parallel to the axis of said guide arm and in which said cartridge housing is provided with cam means and which comprises switch means carried by said projector housing and controlling at least one predetermined function of said projector, and cam follower means adapted to cooperate with said cam means and with said switch means so as to actuate said switch means upon engagement of said cam follower means with said cam means when said cartridge carrier is moved to its operative position.

19. The motion picture projector, as set forth in claim 11, which comprises a projector housing pivotally mounting said cartridge carrier for movement between operative and inoperative positions on an axis which is parallel to the axis of said guide arm, and in which said arm actuating means comprise an actuating arm, which is pivotally mounted in said projector housing on an axis which is parallel to the axis of said cartridge carrier, said actuating arm having a free end which is interengageable with said guide arm, gear means operatively connecting said cartridge carrier and said actuating arm in such a manner that the latter moves said guide arm to its operative position in response to a movement of said cartridge carrier to its operative position.

20. A motion picture projector as set forth in claim 19, in which said actuating arm carries at said free end a coupling device and is adjustable in a predetermined direction parallel to the pivotal axis of said guide arm to interengage said coupling device with said guide arm and said projector comprises control means which are arranged to effect an adjustment of said actuating arm in said predetermined direction during a first phase of the movement of said cartridge carrier from its inoperative position to its operative position, whereby said guide arm and said actuating arm are caused to interengage.

21. The motion picture projector, as set forth in claim 19, wherein said gear means are of the type transmitting different speeds during their angular movement, so as to move said actuating arm in an initial phase of said movement of said cartridge carrier from its inoperative to its operative position at a lower velocity than said cartridge carrier, including a velocity of zero, and to move said actuating arm at a higher angular velocity than said cartridge carrier in a final phase of said movement of said cartridge carrier.

22. Apparatus for handling a striplike record carrier in at least two different modes of operation, said apparatus comprising a cartridge carrier, a housing mounting said cartridge carrier for movement relative thereto between an inoperative position and an operative position, a cartridge detachably carried by said cartridge carrier for movement in unison therewith, said cartridge having a cartridge housing holding a striplike record carrier and being operable to supply said record carrier out of said housing and to take up said record carrier back into said housing, said cartridge housing being provided with recessed cam means, said apparatus comprising switch means for controlling said modes of operation of said apparatus, and pin means carried by said cartridge housing and arranged to move from an inoperative position to an operative position in response to a predetermined actuation of said switch means, said pin means being arranged to prevent a movement of said cartridge carrier to its operative position unless said pin means are in registry with and received by said recessed cam means.

23. Apparatus for handling a striplike record carrier in at least two different modes of operation, said apparatus comprising a cartridge carrier, a housing mounting said cartridge carrier for movement relative thereto between an inoperative position and an operative position, a cartridge detachably carried by said cartridge carrier for movement in unison therewith, said cartridge having a cartridge housing holding a striplike record carrier and being operable to supply said record carrier out of said housing and to take up said record carrier back into said housing, said cartridge housing being provided with cam means, said apparatus comprising switch means for controlling said modes of operation of said apparatus, said cartridge housing being provided with cam follower means adapted to cooperate with said cam means and with said switch means so as to actuate said switch means upon engagement of said cam follower means with said cam means when said cartridge carrier is moved to its operative position.

References Cited

UNITED STATES PATENTS

| | | | |
|---|---|---|---|
| 1,020,152 | 3/1912 | Musk | 206—52 |
| 1,691,414 | 11/1928 | Thornton | 242—55.11 |
| 2,578,283 | 12/1951 | Bornemann | 242—71.1 X |
| 2,869,799 | 1/1959 | Hunter | 242—55.13 X |
| 3,208,363 | 9/1965 | Easterly | 352—72 X |

NORTON ANSHER, Primary Examiner

MONROE H. HAYES, Assistant Examiner

U.S. Cl. X.R.

242—55.13, 71.2